United States Patent
Schmitt et al.

[11] Patent Number: 5,922,971
[45] Date of Patent: Jul. 13, 1999

[54] ROTATION-ANGLE SENSOR FOR DISPLAYING A PLURALITY OF ROTATIONS OF A SHAFT

[75] Inventors: Hans-Michael Schmitt, Muennerstadt; Oswald Reuss, Unterelsbach, both of Germany

[73] Assignee: Preh-Werke GmbH & Co. KG, Bad Neustadt/Saale, Germany

[21] Appl. No.: 08/905,348

[22] Filed: Aug. 4, 1997

[30] Foreign Application Priority Data

Aug. 14, 1996 [DE] Germany ............... 196 32 766

[51] Int. Cl.[6] .................. G01L 3/00; G01B 7/00
[52] U.S. Cl. .................. 73/862.331; 324/207.12
[58] Field of Search ............ 73/514.39, 862.331, 73/862.326, 862.334, 862.324; 324/207.12, 207.22, 207.25, 173, 174, 209

[56] References Cited

U.S. PATENT DOCUMENTS 4,812,803  3/1989  Hochholzer ............... 338/175
4,908,598  3/1990  Burger et al. ............. 338/174
5,539,373  7/1996  Pfaffenberger et al. ..... 338/196

FOREIGN PATENT DOCUMENTS 30 10 354  10/1980  Germany.
42 12 387  10/1993  Germany.

*Primary Examiner*—Hezron Williams
*Assistant Examiner*—Helen C. Kwok
*Attorney, Agent, or Firm*—Griffin, Butler, Whisenhunt & Szipl, LLP

[57] ABSTRACT

In known sensors, "failure" conditions led to approximately a 10 fold amplification of the failures. Contrary to this, a rotation-angle sensor of this invention provides a rotation-angle sensor housing (5) held within a component cover (1) to have translatory movement, with a rotation-angle-sensor shaft (3) and a component shaft (6) being coupled via a coupling piece (7). Each shaft end (8, 9) of the coupling piece has flat-edge portions, with one shaft end (9) having many more of flat-edge portions than does the other shaft end (8). The rotation-angle-sensor shaft (3) and the component shaft (6) have complementary recesses for receiving the shaft ends. This rotation-angle sensor is particularly adapted to be used for monitoring brake lining of vehicles.

7 Claims, 3 Drawing Sheets

ROTATION-ANGLE SENSOR FOR DISPLAYING A PLURALITY OF ROTATIONS OF A SHAFT

BACKGROUND OF THE INVENTION

This invention concerns a rotation-angle sensor for displaying a plurality of rotations of a shaft using a geared-down drive and a potentiometer unit whose resistance-adjustment angle is smaller than one complete revolution, with a coupling from a rotation-angle-sensor housing to outside a component cover being formed by flexible leads. Such a sensor can be used, for example, for displaying wear of brakes for street vehicles.

With increasing safety demands for street vehicles, in conjunction with increased use of electronics, function monitoring with sensors of machinery requiring safety, such as wheel brakes, is increasingly becoming mandatory.

The manner in which brakes operate is that an operation force is applied via a lever which is transmitted via a threaded spindle to thrust against a brake lining. An automatic wear adjuster, which is integrated with the threaded spindle, compensates for the resulting lining and disk wear by screwing the threaded spindle outwardly. The threaded-spindle rotations are used to indirectly read the wear by use of a rotation-angle sensor.

The sensor continually monitors wear of the lining and disk layer throughout a predetermined wear lifetime, there being, at each possible operation and maintenance condition of a brake, a definite relationship between wear and a signal value of the sensor.

In this regard, during the lifetime, that is until the brake lining is worn away, the threaded spindle goes through about ten revolutions, which requires a "gearing down" mechanism, because normally a rotation potentiometer is maximally operative through only one revolution. Thus, in order to achieve an accurate indication of brake wear: firstly, an exact alignment of a shaft of the rotation-angle sensor, which includes the potentiometer, to the threaded spindle is necessary; and, secondly an exact alignment of a rotation-angle-sensor housing itself to the rotation spindle, or a component in which it is mounted, is necessary because a flawed arrangement could magnify a mistake by a factor of ten in a displayed resistance value.

Accordingly, it is an object of this invention to provide an apparatus which allows extremely exact relationships of shafts to one another and of a rotation-angle housing to a monitored component shaft, and further which allows simplified maintenance because the component, with the component shaft, and the rotation-angle sensor can be dismounted and mounted without being relatively adjusted to one another.

SUMMARY

According to principles of this invention, a rotation-angle-sensor housing is held within a component cover so as to have translational motion therein, with a rotation-angle-sensor shaft and a component shaft being coupled via a coupling piece. Shaft ends of the coupling piece have flat-edge portions, with one shaft end having more flat-edge portions than the other end and the rotation-angle-sensor shaft and the component shaft having complementary recesses for receiving these ends of the coupling piece.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIEMENT

Figure 1:
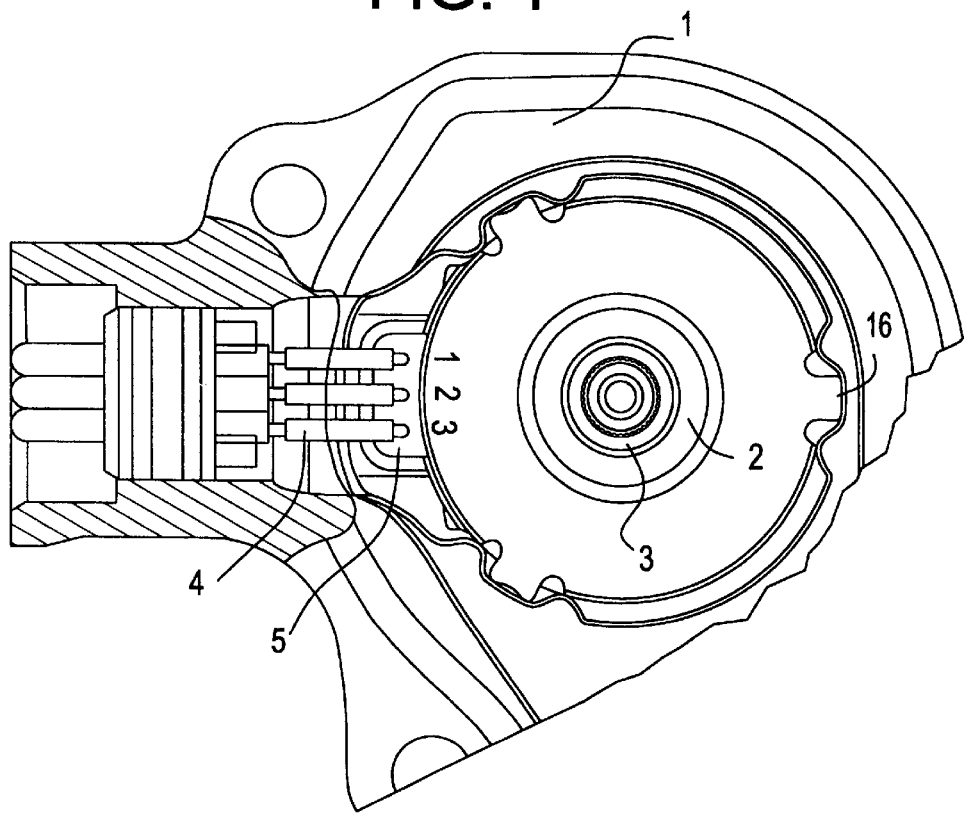
FIG. 1 is a cutaway top view of a rotation-angle-sensor arrangement of this invention.

FIG. 1 shows a top view of an open, or cutaway, component cover 1 in which is normally arranged a rotation-angle sensor 2 for displaying rotation-angles of a plurality of rotations of a rotation-angle-sensor shaft 3 via a geared-down linkage and a potentiometer unit, wherein an operative, or active movement angle of the potentiometer unit is smaller than one complete revolution and wherein the potentiometer unit is electrically coupled via flexible leads 4 running between a rotation-angle-sensor housing 5 and the component cover 1, thereby creating a connecting plug.

Figure 2:
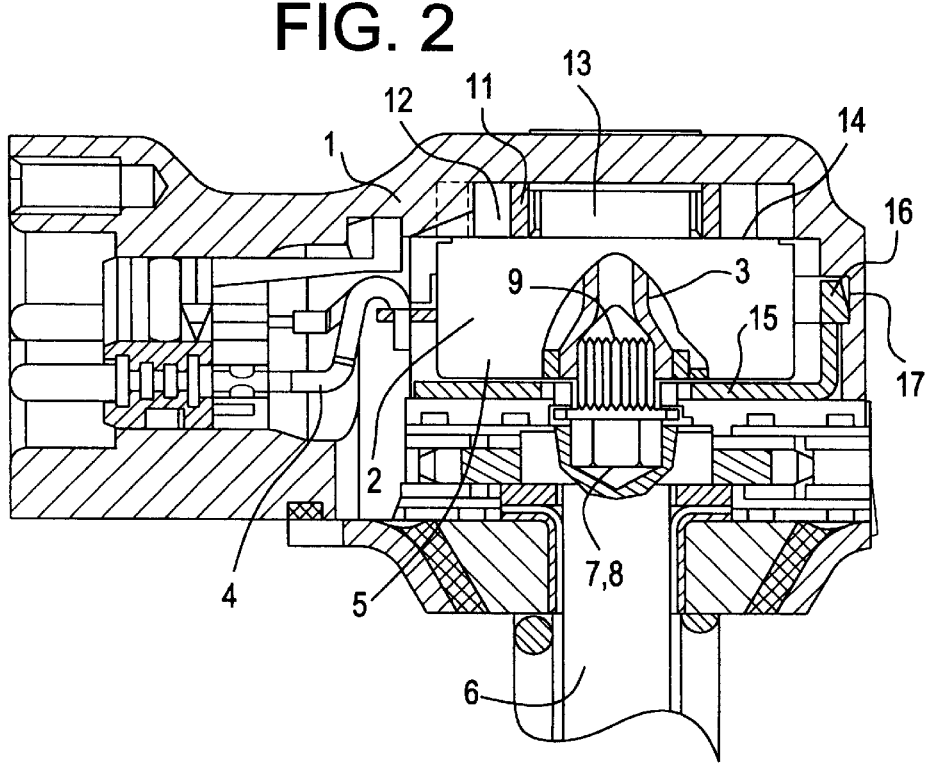
FIG. 2 is a side cross-sectional view of the apparatus depicted in FIG. 1.

According to this invention: the rotation-angle-sensor housing 5 is supported within the component cover 1 to have some lateral, or translatory freedom of movement; the rotation-angle-sensor shaft 3 and a component shaft 6, as depicted in FIG. 2, are coupled together by a coupling piece 7; there are flat-edge portions at each shaft end, 8, 9, with the shaft end 9 having many times more flat-edge portions than the other shaft end 8; and shaft portions of the rotation-angle-sensor shaft 3 and the component shaft 6 have corresponding complementary recesses.

In this manner, it is accomplished that a highly exact arrangement between the respective shafts 3, 6 of the rotation-angle sensor 2 and the component is maintained, with the coupling piece 7 being beneficially made to have 6 flat-edge portions at one shaft end and eighteen V-arranged flat-edge portions at its other shaft end, as is shown in FIG. 2.

Figure 3:
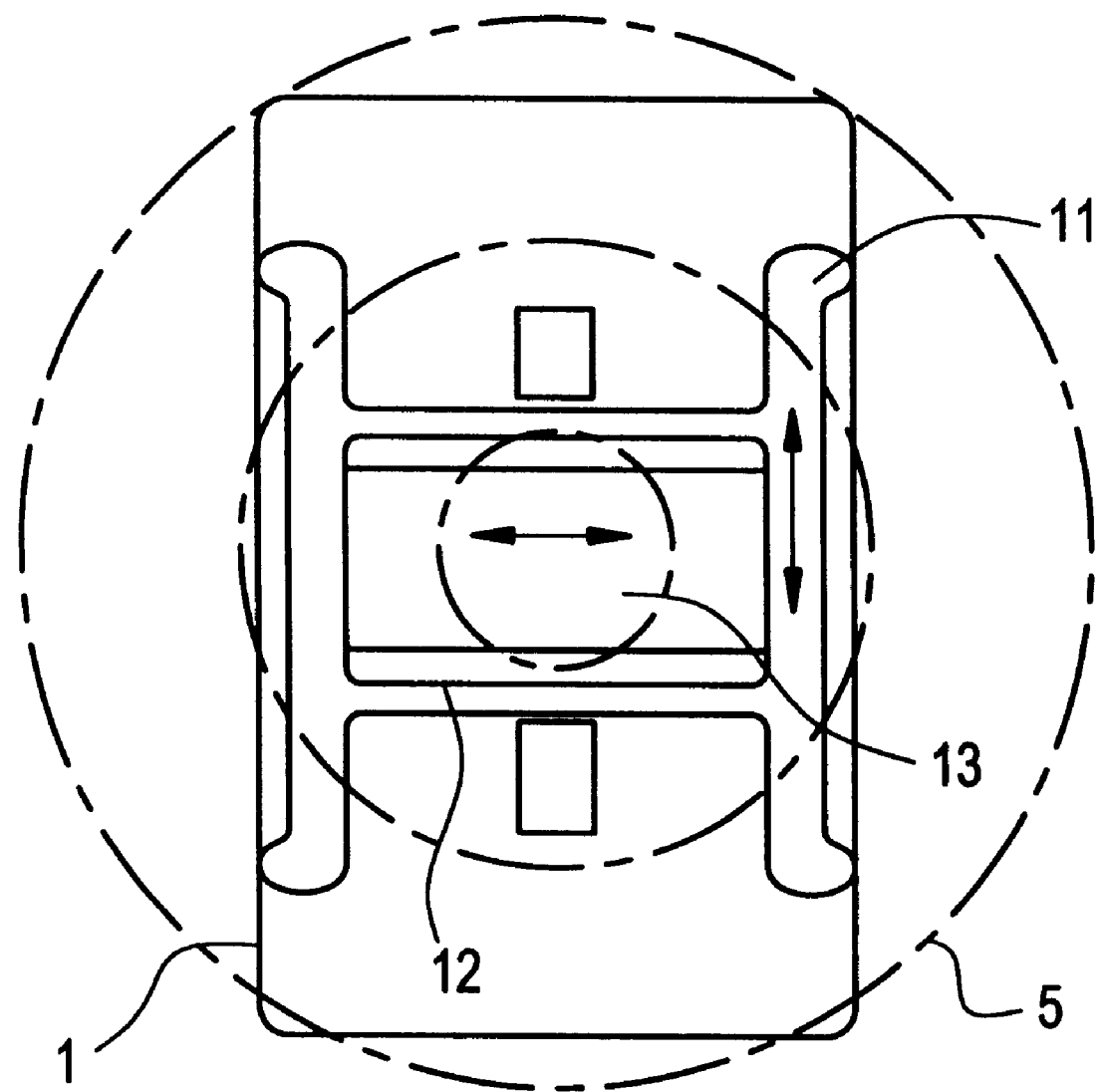
FIG. 3 is a schematic representation of a cardanic sled within a housing track, which is part of this invention.

When this is done, the usual 60° divisions of 6-edge ends is reduced to 20° divisions. The translatory movement (arrow) of the rotation-angle-sensor housing 5 (shown by dot-dash lines in FIG. 3) is achieved by use of a cardan, or gimble ring, sled 11 which is linearly guided in the component cover 1 and in a sled track 12 which is arranged perpendicular thereto for one or more housing guide pins 13, as can be seen in FIG. 3.

It is provided (FIG. 2) that the rotation-angle-sensor housing 5 is held in an axial direction of the shafts 3, 6 by a housing support wall 14 and a holding basket 15 which is mounted in the component cover 1. In this regard, holding arms 16 of the holding basket 15, which is made of resinous plastic, can snap into component-cover indentations 17.

It has proven to be sufficient if the translatory movement is approximately 1.2. mm in every direction. The potentiometer unit is constructed to allow complete rotations in order to avoid its distruction in case of an improper setting or mounting.

Figure 4:
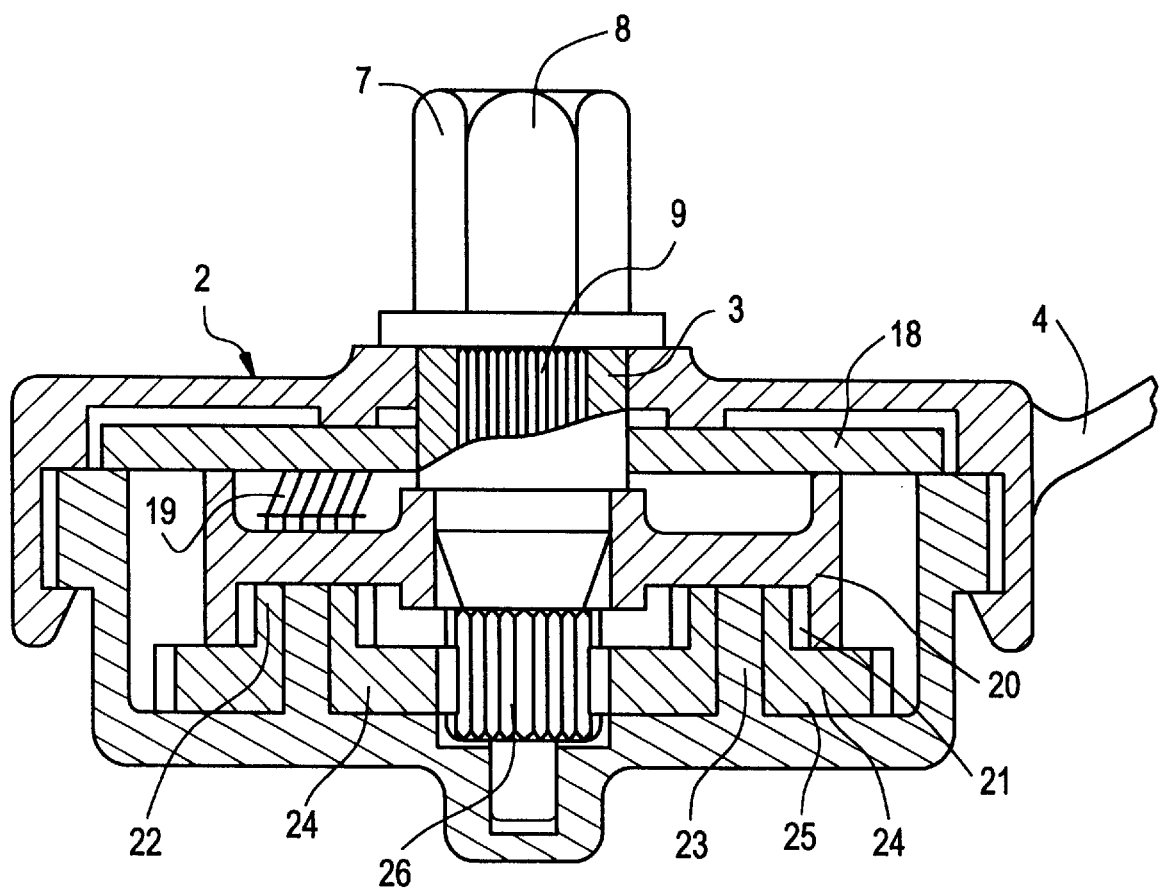
FIG. 4 is a cross-sectional view taken through a rotation-angle sensor of this invention.

A suitable mechanism for providing the geared-down linkage is a planet gear, shown in cross section in FIG. 4, which is subject to a self-limitation relative improper adjustments so that upon mounting, dismounting, and mounting of adjacent elements, an unintended improper adjustment of the rotation-angle-sensor shaft relative to the component shaft is not allowed nor a corresponding wear and signal value.

FIG. 4 shows the cross section taken through the rotation-angle sensor 2 as an individual element in which the potentiometer unit, comprising a platen 18 with resistance bands thereon can be seen. The resistance bands are brushed by a sliding spring 19 which is attached to a hollowed wheel 20 of the planet gear. The hollowed wheel 20 has inner teeth 21 which engage with small gears 22 of a plurality of planet gears 24 which are mounted on pins 23 in the rotation-angle-sensor housing. A larger gear 25 of the planet gears 24 mashes with teeth 26 of the rotation-angle-sensor shaft 3 (as a sun wheel).

FIG. 4 depicts the coupling piece 7 with the shaft ends 8 and 9, the shaft end 9 being the eighteen V-shaped edge portion end. The resistance bands of the platen 18 are coupled with the coupling leads 4.

With the invention, the following operations can be carried out with a vehicle brake system:

- continuous wear monitoring with a "wear-end" indication;
- monitoring of brake functions using plausibility comparisons of various brakes;
- service simplification;
- a harmonizing of wear between a plurality of axles.

While the invention has been particularly shown and described with reference to a preferred embodiment, it will be understood by those skilled in the art that various changes in form and detail may be made therein without departing from the spirit and scope of the invention.

We claim:

1. A rotation-angle sensor for displaying a plurality of rotations of a component shaft of a component, said rotation angle sensor having a rotary potentiometer unit with a geared-down drive whose active adjustment angle is smaller than one complete revolution and which is electrically coupled between a rotation-angle-sensor housing containing the potentiometer and a component cover containing the rotation-angle-sensor housing by flexible leads; wherein the rotation-angle-sensor housing (5) is held within the component cover (1) so as to have translatory motion relative to a rotation axis of the component shaft (6); a coupling piece (7) is included for coupling a rotation-angle-sensor shaft (3) of the geared-down drive with the component shaft (6), shaft ends (8, 9) of the coupling piece having flat-edge portions, with one shaft end (9) having many more of the flat-edge portions than the other end (8); and the rotation-angle-sensor shaft (3) and the component shaft (6) have complementary recesses for receiving the shaft ends of the coupling piece.

2. A rotation-angle sensor as in claim 1 wherein the coupling piece (7) has at one end (8) six flat edges and at the other end (9) eighteen V-arranged flat-edge portions.

3. A rotation-angle sensor as in claim 1 wherein is further included a cardan sled (11) for mounting the rotation-angle-sensor housing to the component, said cardan sled being itself mounted to have a first linear movement in the component cover (1) and defining a sled track (12) arranged perpendicular to the first linear movement for receiving at least one pin (13) of said rotation-angle-sensor housing and allowing linear movement thereof, for thereby creating the translatory movement of the rotation-angle-sensor housing (5).

4. A rotation-angle sensor as in claim 1 wherein the rotation-angle-sensor housing 5 is held in an axial direction of the component shaft by a housing support wall (14) of the component cover (1) and a holding basket (15) which is mounted in the component cover (1).

5. A rotation-angle sensor as in claim 3 wherein the translatory movement is approximately 1.2 mm in every direction.

6. A rotation-angle sensor as in claim 1 wherein the potentiometer allows continuous complete rotations.

7. A rotation-angle sensor as in claim 1 wherein the gear-down drive comprises a planet-gear system which is subjected to self-limitations for preventing improper adjustments.

* * * * *